United States Patent
Niu (10) Patent No.: US 9,278,827 B2
(45) Date of Patent: Mar. 8, 2016

(54) REEL WITH BUILT IN PALLET

(75) Inventor: Xiaokai Niu, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 568 days.

(21) Appl. No.: 13/591,630

(22) Filed: Aug. 22, 2012

(65) Prior Publication Data

US 2014/0056683 A1     Feb. 27, 2014

(51) Int. Cl.
*B65H 75/14*     (2006.01)
*B65H 75/18*     (2006.01)
*B65G 57/26*     (2006.01)

(52) U.S. Cl.
CPC ............... *B65H 75/14* (2013.01); *B65G 57/26* (2013.01); *B65H 75/18* (2013.01); *B65H 2701/534* (2013.01)

(58) Field of Classification Search
CPC ...... B65H 75/14; B65H 75/18; B65H 75/185; B65H 75/40; B65H 75/44; B65H 49/328; B65H 67/066; B65H 2701/534; B65G 57/26
USPC ......................................................... 242/605
See application file for complete search history.

(56) References Cited

U.S. PATENT DOCUMENTS

| 2,834,507 | A | * | 5/1958 | Metzler et al. | 206/509 |
| 3,334,841 | A | * | 8/1967 | Burhop | 242/118.61 |
| 3,857,486 | A | * | 12/1974 | Klebanoff, Jr. | 206/599 |
| 4,190,214 | A | * | 2/1980 | Bond | 242/138 |
| 4,208,021 | A | * | 6/1980 | Wall | 242/594.3 |
| 5,121,517 | A | * | 6/1992 | Frentzel-Beyme | 8/149.1 |
| 5,169,086 | A |   | 12/1992 | Vesely | |

(Continued)

FOREIGN PATENT DOCUMENTS

| CH | 705467 A1 | * | 3/2013 |
| DE | 2033923 A1 | * | 2/1971 |
| FR | 2938519 A1 | * | 5/2010 |

(Continued)

OTHER PUBLICATIONS

Machine Translation of CH 705467 A1, Mar. 2013.*

(Continued)

*Primary Examiner* — William E Dondero
(74) *Attorney, Agent, or Firm* — Miller, Matthias & Hull LLP (57) ABSTRACT

A cable reel for holding a cable wound thereon that includes a cylindrical drum having a longitudinal axis, a first end, and a second end spaced from the first end. The cable reel also includes a first flange that is coupled to the first end of the cylindrical drum and a second flange that is coupled to the second end of the cylindrical drum. The cable reel further includes a spacer that extends axially outward from the first flange. The spacer is configured to support the reel with the first flange spaced above a support surface when the longitudinal axis of the reel is in a substantially vertical orientation and with the reel being supported on the support surface by the spacer.

20 Claims, 6 Drawing Sheets

(56) References Cited

U.S. PATENT DOCUMENTS

| | | | |
|---|---|---|---|
| 5,720,397 A | | 2/1998 | Thompson |
| 5,897,075 A | | 4/1999 | Elder et al. |
| 5,941,477 A | | 8/1999 | Basili et al. |
| 6,533,216 B1 | * | 3/2003 | Bumgarner et al. .......... 242/603 |
| 6,938,767 B2 | * | 9/2005 | Gelmetti ....................... 206/408 |
| 2004/0211851 A1 | * | 10/2004 | Barton et al. ................. 242/171 |
| 2006/0086863 A1 | * | 4/2006 | Couchey et al. ........... 242/610.6 |
| 2009/0084887 A1 | * | 4/2009 | Aiston et al. ............... 242/587.2 |
| 2009/0272837 A1 | * | 11/2009 | Piovesan ....................... 242/600 |

FOREIGN PATENT DOCUMENTS

| | | | |
|---|---|---|---|
| FR | 2938520 A1 | * | 5/2010 |
| GB | 2425766 A | * | 11/2006 |

OTHER PUBLICATIONS

"Application Note: Corning Optical Fiber Shipping Spools and Spool Covers," Sep. 2014, Corning Incorporated.

"Application Note: Packaging Information and Recommended Handling of Optical fiber Spools, Spool Covers, Corrugated Boxes, and Plastic Shipping Totes," Sep. 2014, Corning Incorporated.

"Application Note: Slot Plugs—Recommended Handling Procedures," Jun. 2009, Corning Incorporated.

J. Johnson and M. Lopez, "Application Note: Recommended Best Practices for Measuring Optical Fiber on a Shipping Spool," Jul. 2011, Corning Incorporated.

General Cable, Electric Utility, "Packaging Information: Handling Recommendations and Packaging Information: Recommended Reel Handling Procedures," Apr. 2010.

\* cited by examiner

REEL WITH BUILT IN PALLET

TECHNICAL FIELD

This disclosure relates generally to cable reels for holding cables wound thereon, and more particularly to apparatus and systems for stacking upright cable reels on top of each other.

BACKGROUND

Figure 1:
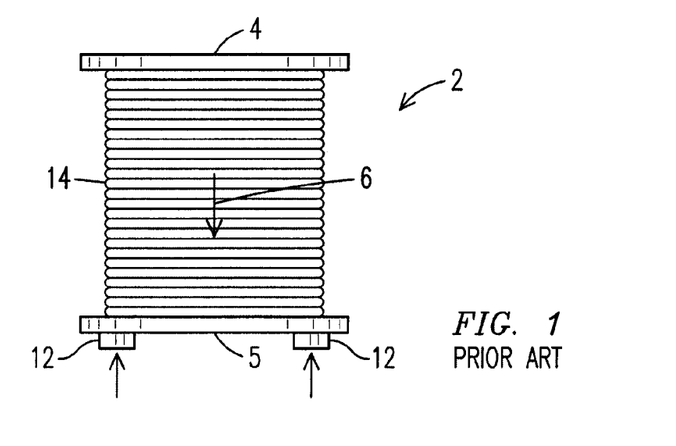
FIG. 1 is a schematic representation of a cable reel as typically found in the prior art.

FIG. 1 is a schematic representation of a cable reel 2 as typically found in the prior art, and which includes a barrel portion (not shown) with flanges 4, 5 attached at both ends. A cable 14 is typically wrapped around the barrel portion and in between the inner surfaces of the flanges 4, 5 while the reel 2 is rotatably mounted on a horizontal spindle installed through spindle holes in the center of the flanges 4, 5. After the cable has been wrapped around the barrel portion, the cable reel 2 is typically turned upright for storage and transportation to the location of intended use, where it is once again mounted onto a spindle and rotated as the cable 14 is fed from the reel 2. While oriented in the vertical and upright position, however, the cable reel 2 must be stackable on top of a lower cable reel 3 of equal or greater size (see FIG. 2B). And whether isolated or stacked, the upright cable reel 2 must also be able to tolerate lateral loadings and forces which may be experienced during storage and transportation (e.g. within the cargo area of a truck) that would otherwise cause the cable reel to tip and fall.

A cable reel 2 that is loaded with wire or cable 14 can be quite heavy, with a significant weight 6 that generally requires a fork truck having forks 12 to lift and move the loaded cable reel. With loaded cable reels 2, it is desirable that the forks 12 be positioned completely under the lower flange 5 of the upright cable reel 2 and towards the outer portion of the flange, but still underneath the boundary of the wrapped cable 14 (as shown in FIG. 1). This ensures that the elevated reel 2 has a wide base to protect against tipping and falling, and with the weight 6 of the cable 14 passing directly downward through the thickness of the flange 5 to the supporting forks 12, and not laterally across the expanse of the flange. If the forks 12 are too far apart, so as to leave the center portion of the flange 5 largely unsupported, the flange could bow or sag downwards in the center under the weight 6 of the cable 14 and eventually crack and fail.

Figure 2A:
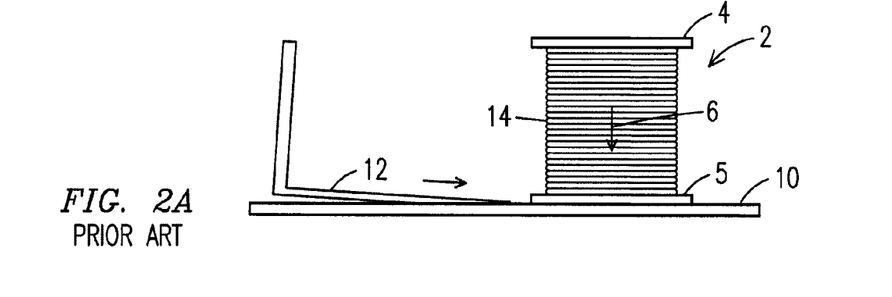
FIGS. 2A and 2B are schematic representations of single and stacked cable reels as typically found in the prior art.
Figure 2B:
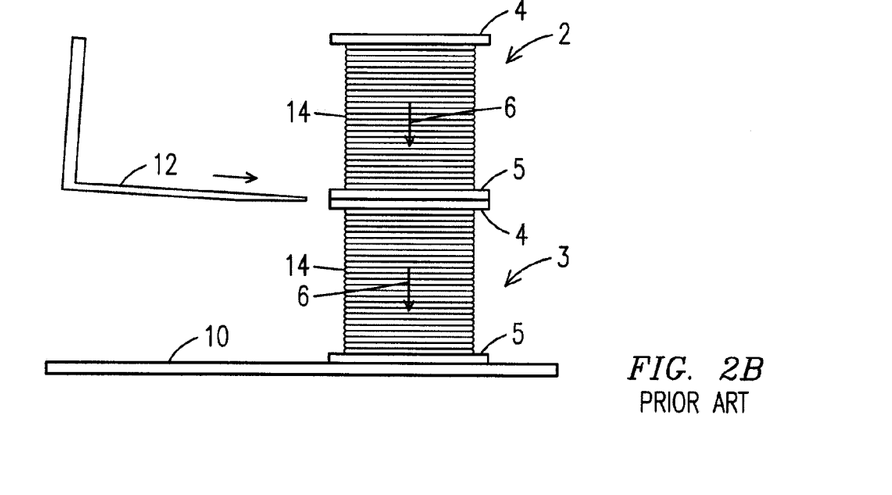

It can be problematic, however, to correctly position the forks 12 under the lower flange 5 of the cable reel 2 when the bottom face of the lower flange 5 is contacting and flush with the ground surface 10 (FIG. 2A), or stacked flush on top of the upper flange 4 of another cable reel 3 (FIG. 2B). This is because the driver of the fork truck, who usually works alone, may have difficulty forcing the forks 12 in between the floor 10 and the bottom flange 5, or in between the top flange 4 of the bottom reel 3 and the bottom flange 5 of the top reel 2 to pick up the reel 2.

What is needed is a system for better supporting an upright cable reel on a ground surface or on the upper flange of a lower cable reel that allows the forks of a fork lift to be properly positioned for lifting and moving the cable reel. Moreover, the system must still provided the support necessary to avoid tipping and falling during storage and stacked transportation (e.g. such as being stacked within the cargo area of a truck, etc.)

SUMMARY

Briefly described, a cable reel for holding a cable thereon includes a cylindrical drum having a longitudinal axis, a first end, and a second end spaced from the first end. The cable reel also includes a first flange that is coupled to the first end of the cylindrical drum and a second flange that is coupled to the second end of the cylindrical drum. The cable reel further includes a spacer that extends axially outward from the first flange. The spacer is configured to support the reel with the first flange spaced above a support surface when the longitudinal axis of the reel is in a substantially vertical or upright orientation and with the reel being supported on the support surface by the spacer.

In another representative embodiment, the cable reel includes a cylindrical drum having ends and flanges extending radially outwardly from the ends of the drum, with each flange having an outer face. The cable reel also includes a spacer that projects outwardly from the outer face of one of the flanges, and which is configured to support the reel on a surface with the outer face of the one flange being spaced from the surface.

In another representative embodiment, a system for stacking a plurality of cable reels that includes a first cable reel and a second cable reel. The first cable reel includes a first cylindrical drum having a first longitudinal axis, a first proximal flange coupled to the first cylindrical portion at a first proximal end, and a first distal flange coupled to the first cylindrical portion at a first distal end spaced from the first proximal end. Similarly, the second cable reel includes a second cylindrical drum having a second longitudinal axis, a second proximal flange coupled to the second cylindrical portion at a second proximal end, and a second distal flange coupled to the second cylindrical portion at a second distal end spaced from the second proximal end.

The system further includes a spacer positioned between an adjacent proximal flange of one of the first cable reel and the second cable reel and an adjacent distal flange of the other of the first cable reel and the second cable reel, with the spacer being coupled to and extending axially outward from one of the adjacent proximal flange and the adjacent distal flange to support the first cable reel when the first cable reel is stacked over the second cable reel so that the first longitudinal axis is substantially coaxial with the second longitudinal axis.

DETAILED DESCRIPTION

Reference is now made in more detail to the above drawing figures, wherein like reference numerals indicate like parts throughout the several views.

Illustrated in FIGS. 3-12 are several representative embodiments of a cable reel and a system for stacking a plurality of cable reels, which embodiments also include various methods for stacking cable reels on top of each other, end-to-end, for transportation and storage. As described hereinbelow, the cable reel stacking system provides several significant advantages and benefits over other systems and methods for stacking and storing cable reels. However, the recited advantages are not meant to be limiting in any way, as one skilled in the art will appreciate that other advantages may also be realized upon practicing the present invention.

Figures 3, 4A, 4B:
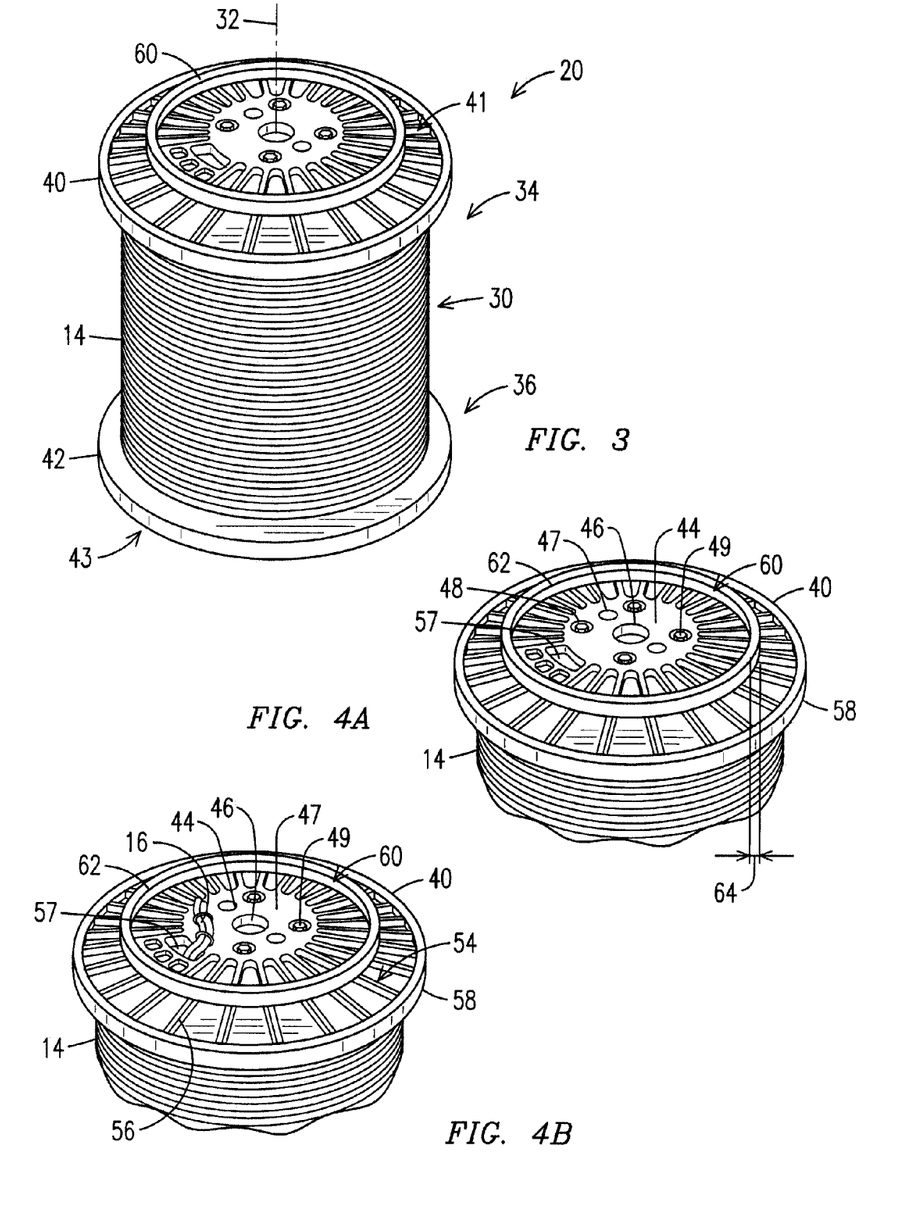
FIG. 3 is a perspective view of a cable reel with a built in pallet, in accordance with an exemplary embodiment of the present disclosure.
FIGS. 4A and 4B are close-up top and perspective views, respectively, of a flange of the cable reel of FIG. 3.

FIG. 3 is a perspective view of a cable reel 20 having a built in pallet, in accordance with a representative embodiment of the present disclosure. The cable reel 20 includes a barrel portion 30 (not visible as it is covered by the cable 14) having a longitudinal axis 32 and a first flange 40 mounted at a first end 34. The first flange 40 includes an outer face 41 having a spacer 60 extending outwardly therefrom in an axial direction. The cable reel 20 also includes a second flange 42 mounted at a second end 35. In some aspects, the outer face 43 of the second flange 42 can include alignment features (not shown) which are complimentary with the spacer 60 that extends axially outward from the outer face 41 of the first flange 40, as will be discussed in more detail below. In other aspects, the outer face 43 of the second flange 42 may not include alignment features.

For visibility purposes, in FIG. 3 the cable reel 20 is oriented with the first flange 40 being the upper or top flange and the second flange 42 being the lower or bottom flange. However, as will be appreciated by one of skill in the art, the orientation of the cable reel 20 is completely reversible, with the first flange 40 being positioned at the bottom and the second flange 42 at the top.

Referring now to FIGS. 4A and 4B, the first flange 40 can comprise a number of structural features formed into or through the outer face 41 which may also be included, but not necessarily required, in other embodiments of the disclosure. These structural features include a central hub portion 44 that more or less aligns with the barrel, a spindle hole 46, and one or more drive holes 47. The hub portion may also include a plurality of bolt recesses 48 with bolts 49 installed therein. The bolts 49 can attach the first flange 40 either directly to the barrel portion or to the second flange 42 with the barrel portion being clasped there between, depending upon the design of the cable reel 20. Other systems and methods for attaching the flange 40 to the barrel or to the opposing flange 42 are also possible and may be considered to fall within the scope of the present disclosure.

The first flange can further include an outer portion 54 that is radially positioned between the hub potion 44 and the outer rim 58 of the flange 40. The outer portion can also include a plurality of structural ribs 56 which stiffen and strengthen the periphery of the flange 40, as well as an optional start hole 57 for feeding the end of the cable therethrough when winding the cable into the cable reel 20. As shown in FIG. 4B, the end of the cable 14 which extends through the start hole 57, also known as a pigtail 16, can be secured to the outer face 41 of the flange 40 with tie wraps.

The second flange 42 can include structural features formed into its outer face 43 which are similar to those included in the first flange, so that the two flanges have a measure of interchangeability when mounted within a mandrel (not shown) during the winding or unwinding of the cable. For instance, both the first and second flanges 40, 42 can include spindle holes 46 and drive holes 47 that are sized and configured for the same type of mandrel apparatus, which allows the cable to be mounted and wound or unwound from either direction.

As shown in FIGS. 3, 4A and 4B, both the first flange 40 and the second flange 42 can be formed from a composite material, such as a compression-molded wood plastic composite, a thermoplastic, and the like, which can allow for the structural features described above to be included in the molds which are used to form the flange. In other embodiments the flanges can be made from wood, such as nailed wood or plywood, which generally result in a smooth outer face 41, 43 of the flanges 40, 42 and in which the spindle hole, the drive hole(s), and the bolt holes may be drilled separately.

In the case of composite flanges, both the spacer 60 included in the first flange 40 and the alignment features (not shown) included in the second flange 42 can be formed integral with their respective flanges or added subsequent to the making of the flange. In the case of the wooden flanges, the spacer and alignment features can be separate structures which are added later.

Figure 5:
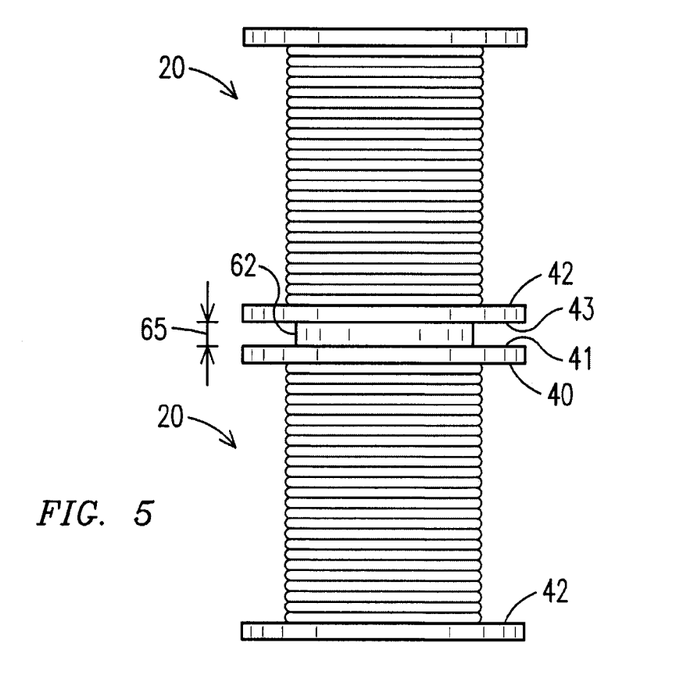
FIG. 5 is a side view of stacked cable reels, in accordance with the embodiment of FIG. 3.

With the embodiment of the disclosure illustrated in FIGS. 4A and 4B, the spacer 60 can comprise a round spacer ring 62 having a thickness 64 that is configured to support the weight of one or more loaded cable reels stacked one on top the other. As shown in FIG. 5, moreover, the spacer ring 62 can have a height 65 that is sufficient to create a gap between the outer faces 41, 43 of the opposing flanges 40, 42 so that the forks 12 of a fork lift can enter between the flanges without having to further pry apart the two faces.

Figure 6:
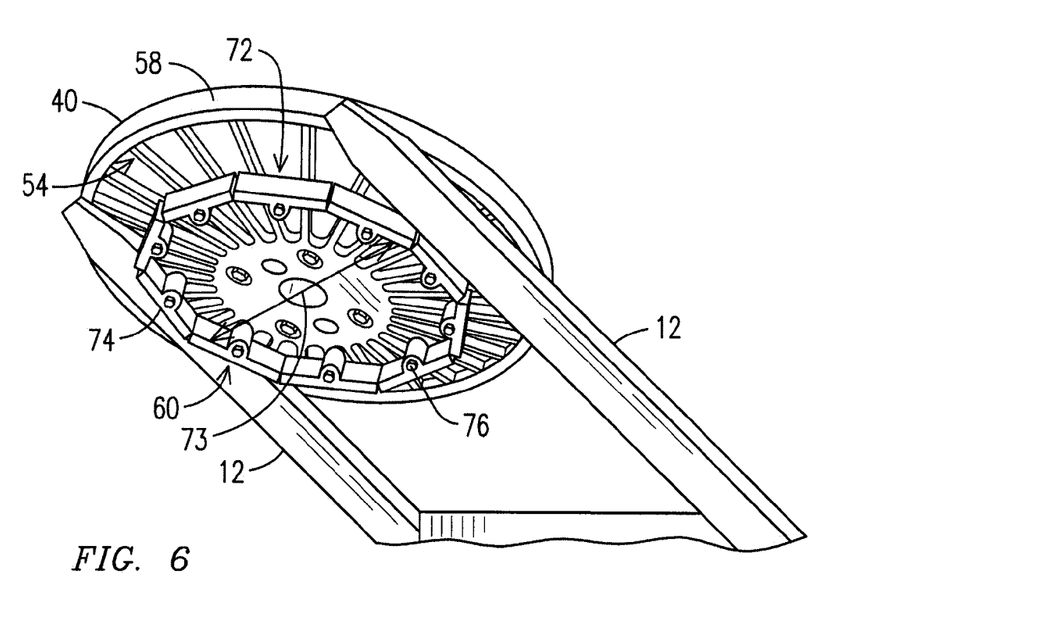
FIG. 6 is an underside view of an upper cable reel supported on a fork lift, in accordance with another exemplary embodiment of the present disclosure.

Finally, as shown in FIG. 6, the spacer 60 (in this case, segmented spacer ring 72) can be centered on the first flange 40, and can have a diameter 73 which locates the spacer ring 72 within the outer portion 54 of the flange first 40, so that the forks 12 will be positioned interior to the outer rim 58 of the flange 40 and underneath the outer boundary of the cable 14 that has been wrapped around the drum of the cable reel 20 (see also FIG. 1).

Figures 7, 7A:
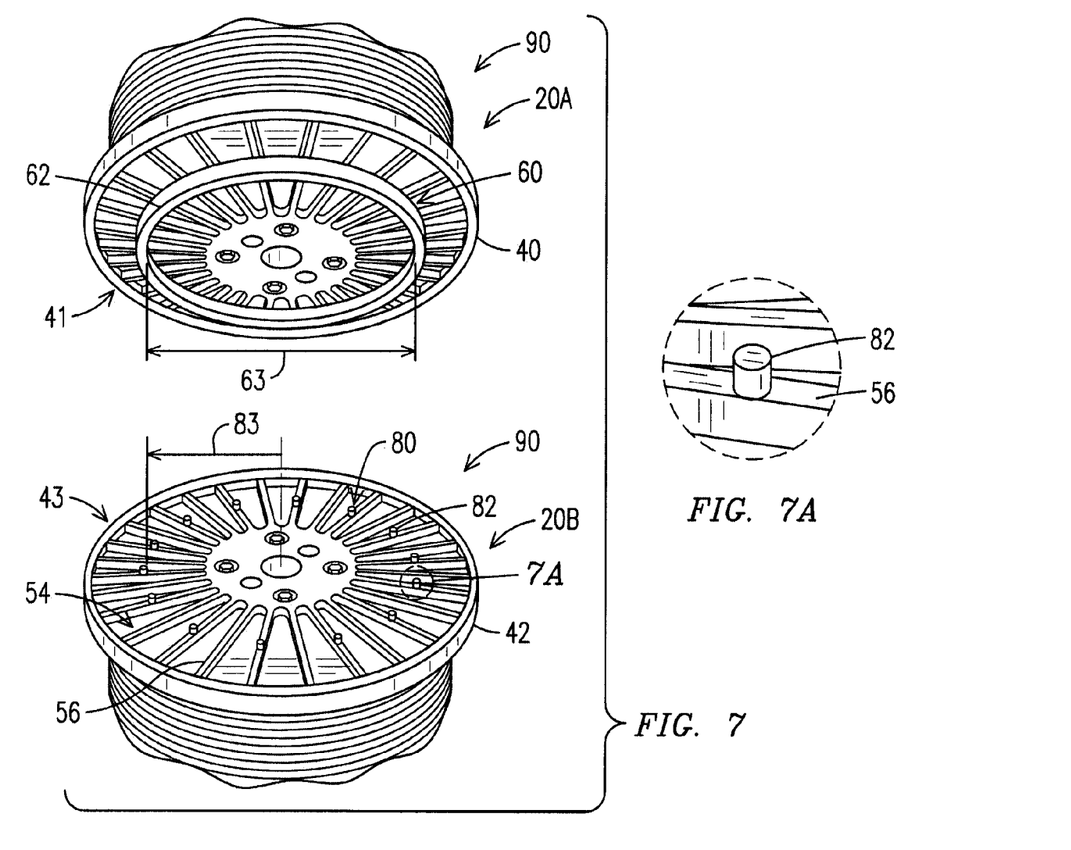
FIGS. 7 and 7A are perspective views of the upper and lower flanges of the cable reel, in accordance with another exemplary embodiment of the present disclosure.
Figure 8:
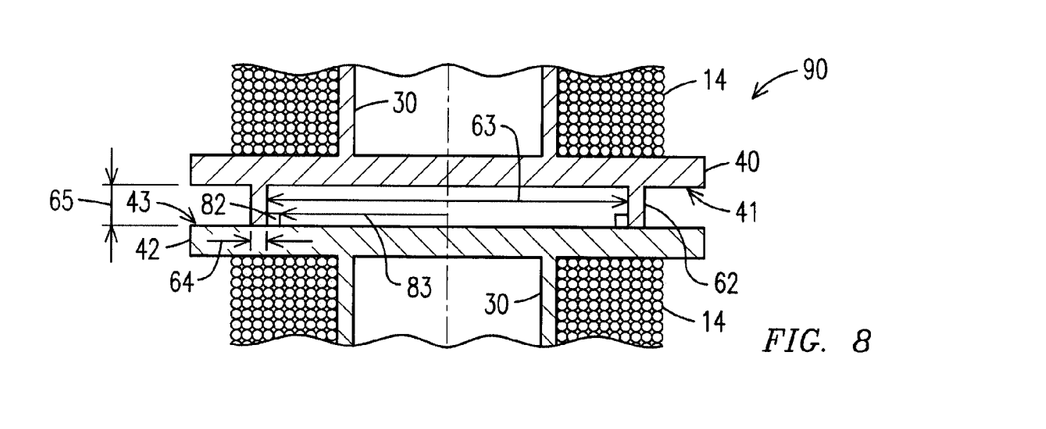
FIG. 8 is a close-up cross-sectional view of the upper and lower flanges of FIG. 7 in a mated configuration.

FIGS. 7, 7A and 8 together illustrate one embodiment of a system 90 for stacking a plurality of cable reels 20A, 20B that includes the spacer 60 or spacer ring 62 of FIG. 3 molded or attached to the outer face 41 of the first flange 40, and one or more complimentary alignment features 80 molded or attached to the outer face 43 of the second flange 42. In this case, the alignment features 80 can include a plurality of alignment tabs 82 located both at an alignment tab radius 83 and at regular angular intervals around the outer face 43 of the second flange 42. As shown in FIG. 7A, in one aspect the alignment tabs 82 can project outwardly in the axial direction from the ribs 56 formed into the outer portion 54 of the second flange 42.

Referring now to FIG. 8, in one aspect the radius 83 of the alignment tabs 82 can be slightly less than ½ the diameter 63 of the spacer ring 62, so that when the two flanges are brought together in alignment, the inside surface of the spacer ring 62 abuts against the outside edges of the alignment tabs 82. Thus, when located at regular angular intervals around the outer face 43 the second flange 42, the alignment tabs 82 can restrict the lateral or sliding movement of the spacer ring 62, and therefore the cable reel 20A, in any direction.

In one aspect, either or both of the inside surface of the spacer ring 62 and outside edges of the alignment tabs 82 may taper away from their complimentary or mating structure, as viewed from the base portion proximate the flange towards the tip of the structure. This taper can provide a wider tolerance when first aligning the two complimentary structures, which then tightens as the two flanges are brought into greater contact with each other.

In yet another aspect of the present disclosure, the radius 83 of the alignment tabs 82 can be substantially less than ½ the diameter 63 of the spacer ring 62, so that when the upper flange 40 is positioned on top the lower flange 42, the inside surface of the spacer ring 62 does not abut against the outside edges of all the alignment tabs 82, but instead contacts fewer than all the alignment tabs, or even possibly no alignment tabs if well centered. Thus, the longitudinal axis of the upper reel 20A may not be forced into alignment with the longitudinal axis of the lower cable reel 20B, but instead can be offset or skewed to one side. Nevertheless, the interaction between the alignment tabs 82 on the second flange 42 and the spacer ring 62 extending from the first flange 40 can be sufficient to keep the upper cable reel 20A from sliding more than a small distance across the outer face 43 on the second flange 42 of the lower cable reel 20B. Such a configuration can make it easier for driver of the forklift to stack the cable reels by allowing for greater tolerances when positioning the upper cable reel 20A on top of the lower cable reel 20B.

It is also to be appreciated that in some embodiments the alignment tabs 82 can be positioned outside the spacer ring 62 and at a radius 83 that is greater (whether slightly or substantially) than ½ the diameter 63 of the spacer ring 62, so that when the two flanges are brought together in alignment, the outside surface of the spacer ring 62 abuts against the inside edges of one or more alignment tabs 82, and thereby restricts the lateral or sliding movement of the spacer ring 62, and therefore the cable reel 20A, in any direction.

Figures 9, 9A:
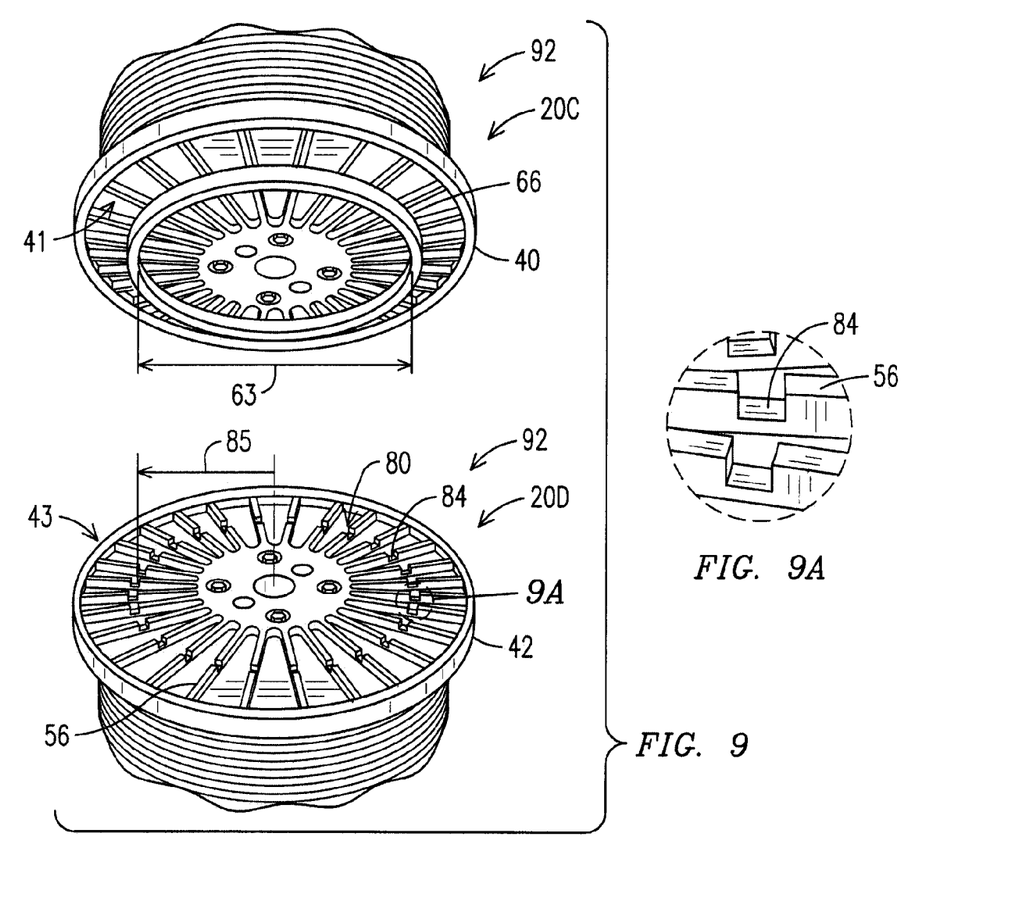
FIGS. 9 and 9A are perspective views of the upper and lower flanges of the cable reel, in accordance with another exemplary embodiment of the present disclosure.
Figure 10:
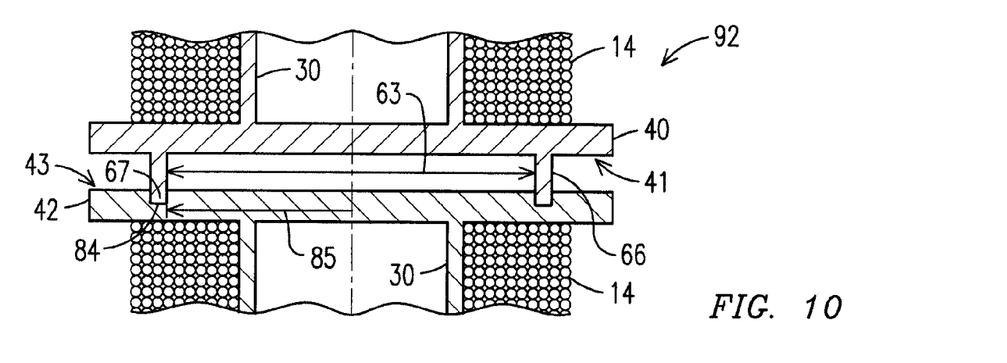
FIG. 10 is a close-up cross-sectional view of the upper and lower flanges of FIG. 9 in a mated configuration.

FIGS. 9, 9A and 10 together illustrate another embodiment of a system 92 for stacking a plurality of cable reels 20C, 20D that includes the spacer 60 or spacer ring 66 (which spacer ring 66 is similar to the spacer ring 62 shown in FIG. 3, only taller) molded or attached to the outer face 41 of the first flange 40. In this case, however, the complimentary alignment feature 80 can include a plurality of alignment slots 84 (or a continuous recess) which have been molded into the outer face 43 of the second flange 41 at an alignment slot radius 85. As shown in FIG. 9A, in one aspect the alignment slots 84 can extend inwardly into the ribs 56 formed into the outer portion 54 of the second flange 41.

Referring now to FIG. 10, the radius 85 of the alignment slots 84 can equal to ½ the diameter 63 of the spacer ring 66, and the spacer ring 66 can have a height 65 that is greater than the embodiment of the spacer ring shown in FIG. 3. Thus, when the two flanges are brought together in alignment, the tip portion 67 of the spacer ring 66 can be captured within the sidewalls of the alignment slots 84 while maintaining the same separation distance between the outer faces 41, 42 of the flanges 40, 42 to allow for insertion of the forks there in between. Like the alignment tabs described above, the alignment slots 84 can also function to restrict the lateral or sliding movement of the spacer ring 66, and therefore the cable reel 20C, in any direction. In providing for an embodiment that allows for greater tolerances in positioning the upper cable reel 20C on top of the lower cable reel 20D, however, in this case the width of the alignment slots 84 can be substantially greater than the thickness of the spacer ring 66 to allow a forklift truck driver greater flexibility in stacking the cable reels.

Figure 11:
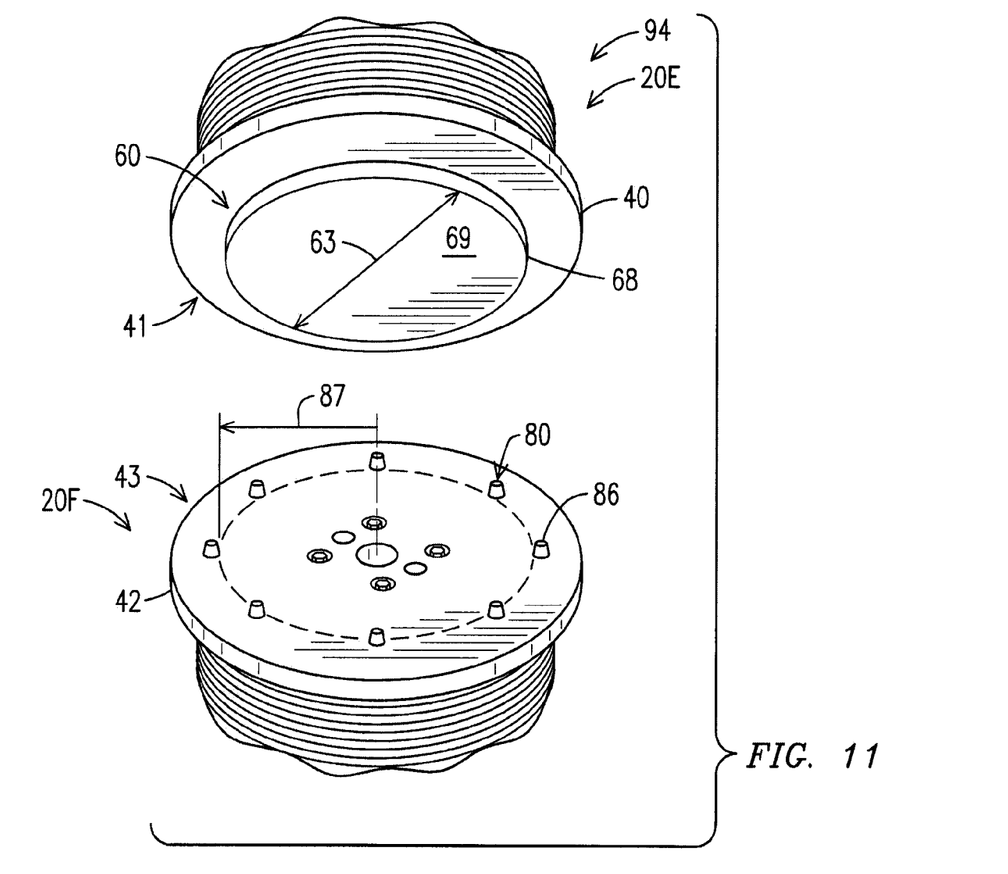
FIG. 11 is a perspective view of the upper and lower flanges of the cable reel, in accordance with yet another exemplary embodiment of the present disclosure.
Figure 12:
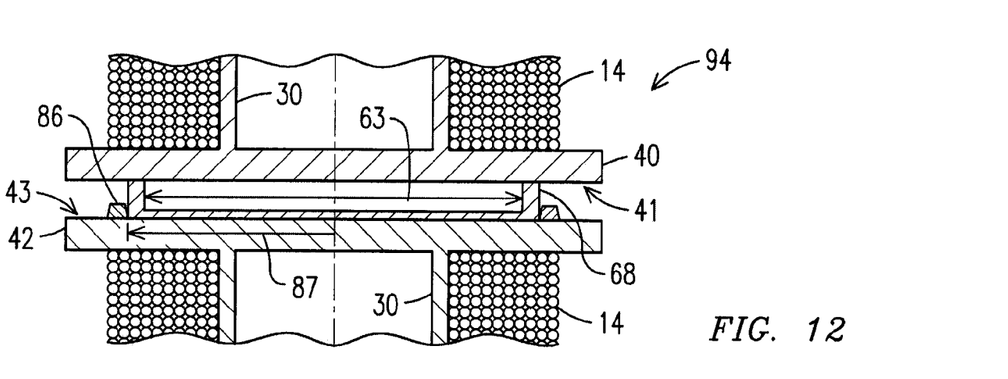
FIG. 12 is a close-up cross-sectional view of the upper and lower flanges of FIG. 11 in a mated configuration.

FIGS. 11 and 12 together illustrate another embodiment of a system 94 for stacking a plurality of cable reels 20E, 20F that includes the spacer 60, in this case a spacer cap 68, that can be removably attached to the outer face 41 of the first flange 40. The spacer cap 68 can have an outer diameter 63 and a substantially-planar top surface 69 which can seat securely against an outer face 43 of a second flange 42 which is substantially flat, such as when the second flange is made of wood. In this case, the complimentary alignment feature 80 can be a plurality of alignment tabs 86 located both at an alignment tab radius 87 and at regular angular intervals around the outer face 43 of the second flange 42, and which can project axially outward from the substantially flat face 43 of the second flange 42.

Referring now to FIG. 12, the radius 87 of the alignment tabs 86 can be slightly greater than ½ the diameter 63 of the spacer cap 68, so that when the two flanges are brought together in alignment, the outside surface of the spacer cap 68 abuts against the inside edges of the alignment tabs 86. Here again, when located at regular angular intervals around outer face 43 the second flange 42, the alignment tabs 86 can restrict the lateral or sliding movement of the spacer cap 68, and therefore the cable reel 20E, in any direction.

And in yet another embodiment of the present disclosure, the radius 87 of the alignment tabs 86 can be substantially greater than ½ the diameter 63 of the spacer cap 68, in order to provide for greater tolerances in positioning the upper cable reel 20E on top of the lower cable reel 20F to allow a forklift truck driver greater flexibility in stacking the cable reels. Nevertheless, the interaction between the alignment tabs 86 on the second flange 42 and the spacer ring 62 extending from the first flange 40 can be sufficient to keep the upper cable reel 20E from sliding more than a small distance across the outer face 43 on the second flange 42 of the lower cable reel 20F.

Another advantage with the alignment cap 68 is that it can cover and protect the pigtail of the cable during storage and transportation of the cable reel 20E. Referring back to FIG. 4B, this is similar to the protection provided to the pigtail 16 of the cable 14 by the open spacer ring 62 shown in the drawing, but with the additional coverage over the top of the volume surrounded and defined by the spacer ring 62.

It is to be appreciated that the spacer 60 of the present disclosure is not limited to the circular embodiments described herein, and may comprise a variety of polygonal shapes included octagons, hexagons, a square, and the like. Such shapes may correspond with complementary recesses formed into the outer surface 43 of the second flange 42. It is also to be appreciated that the spacer 60 can constructed and mounted to the outer surface 41 of the first flange 40 using a variety of methods, including but not limited to the segmented spacer ring 72 shown in FIG. 6 which can be formed from a plurality of segments 74, each of which is individually attached to the first flange 40 with a fastener, such as bolt 76.

The invention has been described herein within the context of preferred embodiments and methodologies considered by the inventor to represent the best mode of carrying out the invention. It will be apparent to those of skill in the art, however, that a large number of additions, deletions, and modifications, both subtle and gross, may well be made to the illustrated embodiments without departing from the spirit and scope of the invention, which is delineated only by the claims hereof.

What is claimed is:

1. A reel for holding a cable thereon, the reel comprising:
   a cylindrical drum having a longitudinal axis, a first end, and a second end spaced from the first end;
   a first flange coupled to the first end of the cylindrical drum and having a central hub, an outer rim, and a plurality of structural ribs extending radially between the central hub and the outer rim;
   a second flange coupled to the second end of the cylindrical drum; and
   a spacer extending axially outward from the structural ribs of the first flange at a mid-span location along lengths of the structural ribs, the spacer being configured to support the reel with the first flange spaced above a support surface when the longitudinal axis of the reel is in a substantially vertical orientation with the reel supported on the support surface by the spacer.

2. The reel of claim 1, wherein the spacer is formed integral with the structural ribs of the first flange.

3. The reel of claim 1, wherein the spacer is coupled to the structural ribs of the first flange.

4. The reel of claim 1, wherein the spacer is symmetric about the longitudinal axis.

5. The reel of claim 1, wherein the spacer is substantially circular.

6. The reel of claim 1, wherein the second flange further comprises:
   a central hub, an outer rim, and a plurality of structural ribs extending radially between the central hub and the outer rim; and
   a plurality of alignment tabs extending axially outward at regular angular intervals from the structural ribs of the second flange,
   wherein a radius of the plurality of alignment tabs is less than a radius of the spacer so that an inside surface of a spacer of another first flange abuts an outside edge of at least one alignment tab to restrict the lateral movement of the other first flange.

7. The reel of claim 6, wherein the alignment tabs are formed integral with the structural ribs of the second flange.

8. The reel of claim 6, wherein the alignment tabs are coupled to the structural ribs of the second flange.

9. A reel for holding a cable thereon, the reel comprising:
   a cylindrical drum having ends and flanges extending radially outwardly from the ends of the cylindrical drum, each flange having an outer face including a central hub, an outer rim, and a plurality of structural ribs extending between the central hub and the outer rim; and
   a spacer projecting outwardly from the structural ribs of the outer face of a lower flange, at a mid-span location along lengths of the structural ribs, when the reel is in a substantially vertical orientation, the spacer being configured to support the reel on a support surface with the outer face of the lower flange being spaced from the support surface.

10. The reel of claim 9, wherein the spacer is formed integral with the structural ribs of the lower flange.

11. The reel of claim 9, wherein the spacer is coupled to the structural ribs of the lower flange.

12. The reel of claim 9, wherein the spacer is substantially circular.

13. The reel of claim 9, further comprising a plurality of alignment tabs projecting outwardly at regular angular intervals from the structural ribs of an upper flange, wherein a radius of the plurality of alignment is less than a radius of the spacer so that an inside surface of a spacer of another lower flange abuts an outside edge of at least one alignment tab to restrict the lateral movement of the other lower flange.

14. The reel of claim 13, wherein the alignment tabs are formed integral with the structural ribs of the upper flange.

15. The reel of claim 13, wherein the alignment tabs are coupled to the structural ribs of the upper flange.

16. A system for stacking a plurality of cable reels, the system comprising:
    a first cable reel, the first cable reel including a first cylindrical drum having a first longitudinal axis, a lower flange coupled to the first cylindrical drum at a lower end, and an upper flange coupled to the first cylindrical drum at an upper end spaced from the lower end;
    a second cable reel, the second cable reel including a second cylindrical drum having a second longitudinal axis, a lower flange coupled to the second cylindrical drum at a lower end, and an upper flange coupled to the second cylindrical drum at an upper end spaced from the lower end; and
    a spacer positioned between opposing faces of the lower flange of the first cable reel and the upper flange of the second cable reel when the first cable reel is stacked over the second cable reel so that the first longitudinal axis is substantially coaxial with the second longitudinal axis,
    wherein the spacer extends axially downward from the lower flange of the first cable reel to support the first cable reel upon and spaced above the upper flange of the second cable reel, and
    wherein the spacer is substantially annular in shape, extends from a plurality of radially extending structural ribs of the lower flange of the first cable reel, and spaced inwardly from an outer rim of the lower flange of the first cable reel to form a circumferential gap between the opposing faces that is accessible with the forks of a fork lift vehicle from all directions.

17. The system of claim 16, further comprising a plurality of alignment tabs extending axially upward at regular angular intervals from the upper flange of the second cable reel, with the radius of the plurality of alignment tabs being less than the radius of the spacer so that an inside surface of the spacer abuts an outside edge of at least one alignment tab to restrict the lateral movement of the first cable reel across the face of the upper flange of the second cable reel.

18. The system of claim 17, wherein the spacer and the alignment tabs are formed integral with the lower flange of the first cable reel and the upper flange of the second cable reel, respectively.

19. The system of claim 17, wherein the spacer and the alignment tabs are coupled to the lower flange of the first cable reel and the upper flange of the second cable reel, respectively.

20. A reel for holding a cable thereon, the reel comprising:
    a cylindrical drum having ends and flanges extending radially outwardly from the ends of the cylindrical drum, each flange having an outer face including a central hub, an outer rim, and a plurality of structural ribs extending horizontally between the central hub and the outer rim when the cylindrical drum is in a vertical orientation;
    a spacer projecting downwardly from the structural ribs of a lower flange when the cylindrical drum is in the vertical orientation, the spacer being configured to support the reel on a support surface with the outer face of the lower flange being spaced from the support surface; and
    at least one alignment feature projecting upwardly from the structural ribs of the upper flange when the cylindrical drum is in the vertical orientation, the at least one alignment feature being complementary with the spacer for contacting an inside surface of the spacer to restrict the lateral movement of the spacer across the outer face of the upper flange.

* * * * *